Nov. 27, 1956  L. M. GAGEANT  2,771,657
EXPANDER AND CONTRACTOR ROLL
Filed Aug. 3, 1953  2 Sheets-Sheet 1
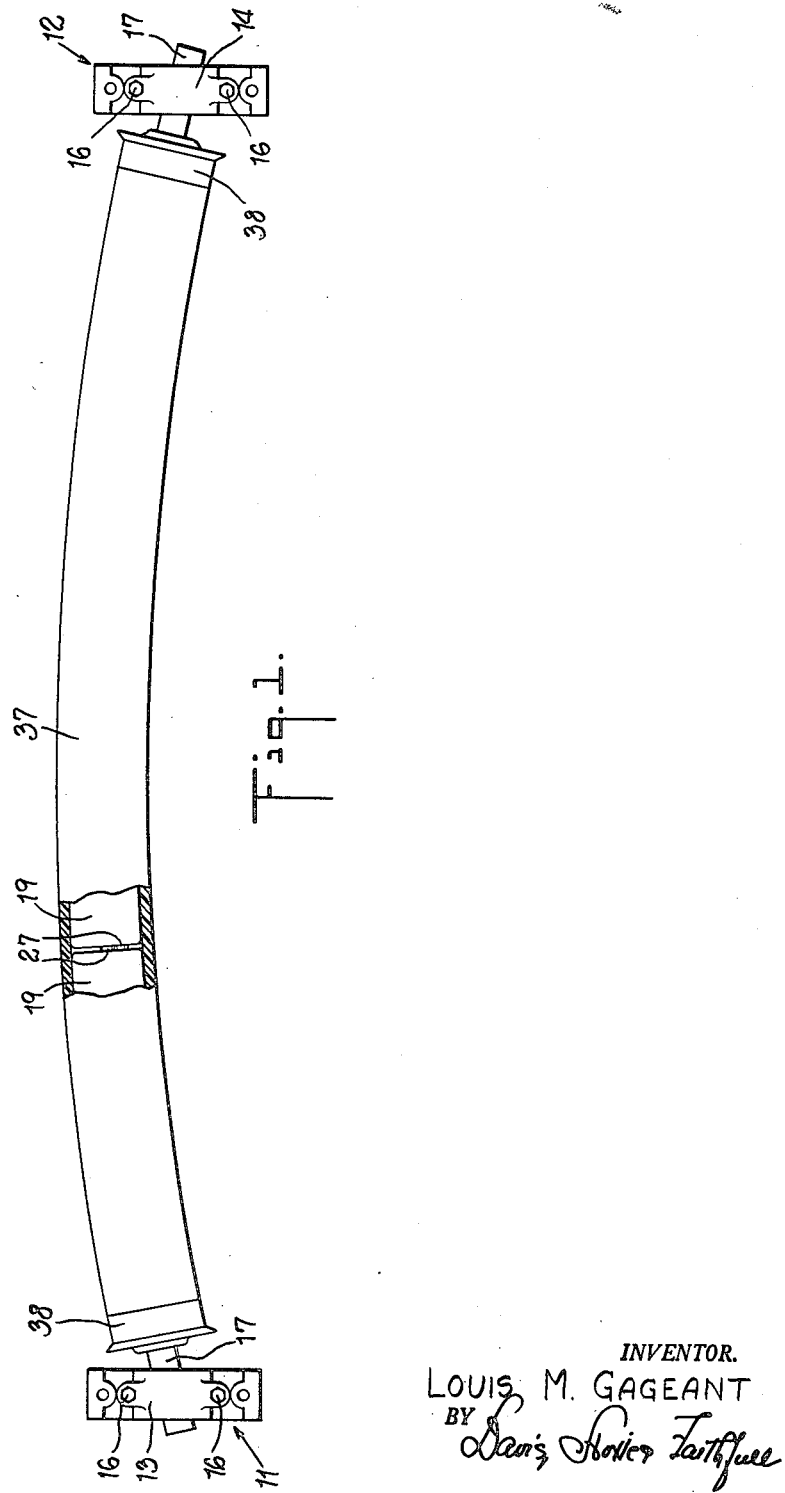
INVENTOR.
LOUIS M. GAGEANT
BY
ATTORNEYS

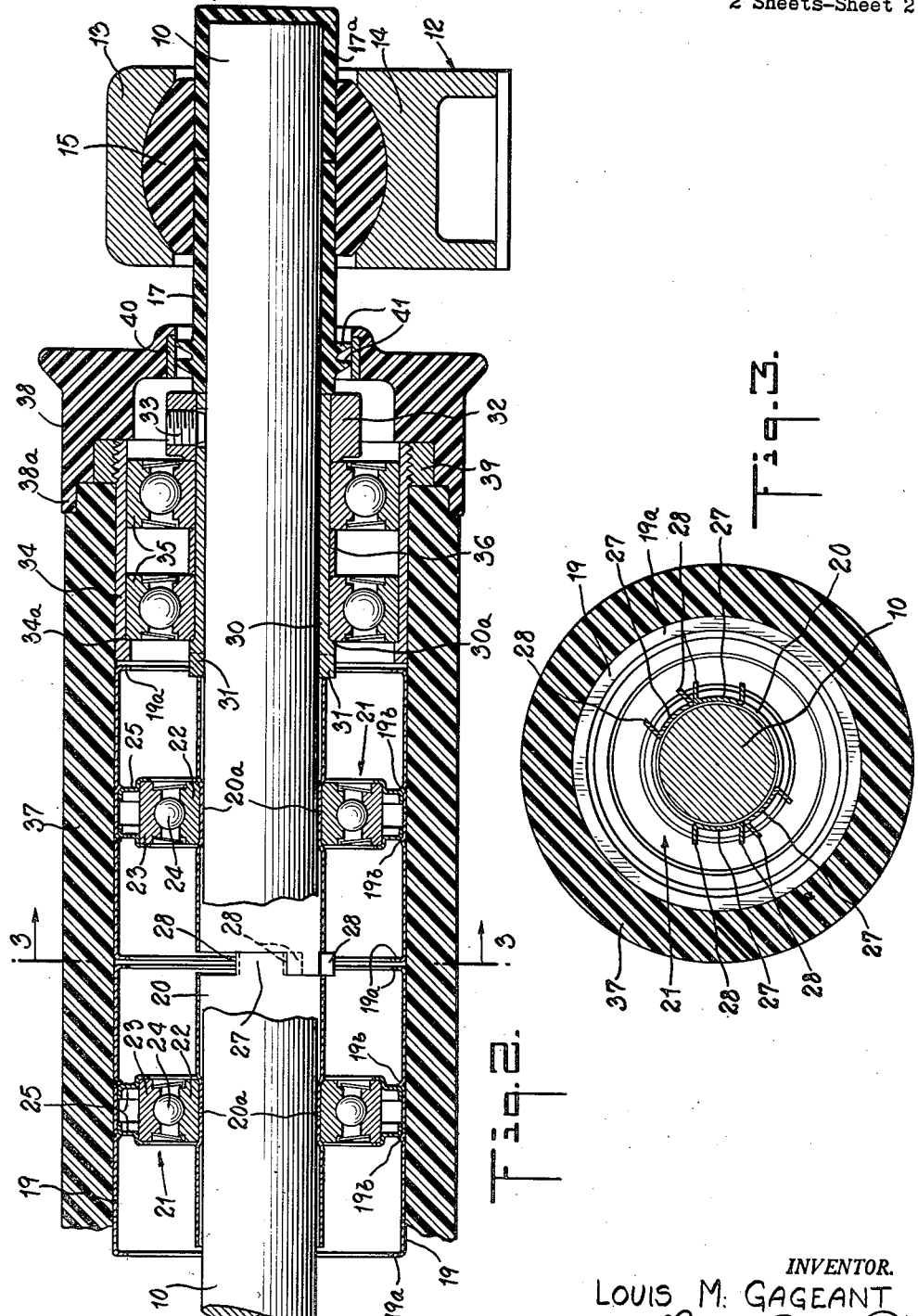

United States Patent Office 2,771,657
Patented Nov. 27, 1956

2,771,657

EXPANDER AND CONTRACTOR ROLL

Louis M. Gageant, North Adams, Mass., assignor to James Hunter Machine Company, North Adams, Mass., a corporation of Massachusetts Application August 3, 1953, Serial No. 371,887

8 Claims. (Cl. 26—63)

This invention relates to expander and contractor rolls for use in changing the width of a flexible sheet material drawn partly around the roll.

Rolls of this type as commonly made comprise a curved or bowed shaft clamped at its ends, a series of metal roll sections rotatably mounted on the shaft in end-to-end relation by means of bearings, and a rubber-like sheath closely surrounding the roll sections and forming the working surface of the roll. If the sheet of fabric, paper, or the like, is fed to the roll at its concave side and leaves the roll at its convex side, the sheet will be spread widthwise as it travels partly around the roll, so that the roll acts as an expander. On the other hand, if the sheet material is fed to the roll at its convex side and leaves the roll at its concave side, the sheet will tend to contract widthwise as it travels partly around the roll, so that the roll acts as a contractor. In either case, the longitudinal movement of the sheet material in contact with the flexible rubber-like surface of the roll causes this surface to rotate about the stationary curved shaft on the roller sections and their bearings, so that one part of the flexible surface is expanding lengthwise of the shaft while a diametrically opposed part is contracting lengthwise.

The roller sections are mounted on the curved shaft by means of anti-friction bearings in order to reduce the drag imposed upon the sheet material as it is drawn partly around the roll. In the use of these bearings, the inner race of each bearing unit is supported on the shaft and must be held against rotation relative to the shaft during the operation of the roll. Heretofore, this requirement has resulted in complicated and expensive structures which usually include a curved shaft having a polygonal cross-section, the inner race of each bearing being either specially machined to give it a corresponding polygonal shape or provided with internal elements engaging the flats of the shaft to prevent rotation on the shaft. Furthermore, these prior rolls do not readily adapt themselves to adjustments of the shaft curvature, as may be necessary when the extent of the expanding or contracting action is to be changed.

The present invention has for its principal object the provision of an expander and contractor roll which overcomes these objections to prior rolls of this type.

A roll made according to the invention comprises a bowed shaft which can be circular in cross-section. The shaft is surrounded by generally cylindrical roll sections spaced from the shaft and disposed in end-to-end relation, these roll sections being closely surrounded by the flexible rubber-like sheathing forming the working face. Within the roll sections is a series of generally cylindrical spacers supported on the shaft and rotatable relative thereto, the spacers having a sliding fit around the shaft. The roll sections are rotatably mounted on the spacers which they surround, by bearing means which also secure each roll section against longitudinal movement relative to the spacer within it. The spacers are slidable along the curved shaft but are interengaged in end-to-end relation so as to hold the roll sections in longitudinally spaced relation to each other. An abutment on each spacer is engageable with an adjacent spacer to prevent rotation of the spacers relative to each other; and rotation of the entire series of spacers relative to the shaft is prevented by means for holding one of the spacers against rotation on the shaft, the latter spacer being preferably at one end of the series.

With this construction, the spacers can be readily assembled in end-to-end relation on the curved shaft, along with the associated bearing units and surrounding roll sections. Moreover, it is not necessary that the shaft be of polygonal cross-section, because the spacer whose angular position is fixed on the shaft will determine and fix the angular positions of the other spacers on the shaft, due to engagement of the spacer abutments with the adjacent spacers.

For a better understanding of the invention, reference may be had to the accompanying drawings, in which:

Fig. 1 is a front elevational view of a preferred form of the new roll, with parts broken away;

Fig. 2 is an enlarged horizontal sectional view along part of the curved shaft axis in Fig. 1; and Fig. 3 is a sectional view on the line 3—3 in Fig. 2.

Referring to the drawings, the numeral 10 designates the curved or bowed shaft of the roll, this shaft being circular in cross-section and substantially rigid. At its ends, the shaft 10 is clamped in brackets 11 and 12, which are identical in construction and may be of conventional form. As illustrated, however, they each comprise metal socket sections 13—14 which receive a core 15 made of a relatively hard rubber-like material. The socket sections are held together by bolts 16 to clamp the core tightly around a cylindrical boot 17, 17a on the corresponding end portion of shaft 10.

Between the brackets 11—12, the shaft 10 is surrounded by a series of cylindrical roll sections 19 made of thin gauge metal and arranged in end-to-end relation. Each roll section 19 has in-turned ends 19a and a pair of internal annular ribs 19b intermediate its ends, it being understood that the parts 19a and 19b can be made by spinning operations. Within each roll section is a cylindrical spacer 20 likewise made of thin gauge metal. Each spacer 20 has intermediate its ends an inwardly extending annular portion 20a of smaller diameter than the adjacent parts of the spacer. This smaller diameter portion 20a surrounds the shaft closely while the other portions of the spacer fit quite loosely around the shaft. Thus, the spacers 20 are easily slidable along the curved parts of the shaft 10, although the central reduced part 20a of each spacer serves to stabilize it on the shaft.

Each roll section 19 is rotatably mounted by bearing means 21 on the spacer 20 within it. The bearing means 21 are each shown as a ball-bearing unit comprising an inner race 22 seated in the smaller diameter portion 20a of the corresponding spacer, an outer race 23, intermediate bearing balls 24, and end rings 25 clamping the outer race 23 and secured at their peripheries between the internal ribs 19b of the roll section. Thus, each bearing unit 21 holds the surrounding roll section 19 against longitudinal movement relative to the spacer 20 within it, in addition to allowing relatively frictionless rotation of the roll section on the spacer.

The cylindrical spacers 20 are each provided at each end with a pair of diametrically opposed longitudinal projections 27 extending over only a minor part of the spacer circumference. These projections 27 are all of the same length, and each projection is somewhat greater in length than the difference between the length of the surrounding roll section 19 and the length of the main body of the spacer exclusive of the projections, it being observed that the latter length is somewhat shorter than the length of the roll section. Accordingly, when the opposed projections 27 on each end of each spacer contact the adjacent end of the next spacer between the opposed projections 27 thereof, as shown in Figs. 2 and 3, the spacers will hold the roll sections 19 in longitudinally spaced relation.

Each longitudinal projection 27 of the spacers has a pair of lateral faces or flanges 28 forming abutments extending generally radially of the shaft 10. As shown, the abutments 28 are formed by outwardly bent tabs on the sides of the projections 27, so that each projection has a pair of opposed abutments. Consequently, when the spacers are held together in the end-to-end relation previously described, rotation of each spacer in one direction relative to an adjacent spacer is prevented by inter-engagement of the abutments 28 on these spacers, as shown particularly in Fig. 3.

At each end of the series of spacers 20 and roll sections 19 is an end adaptor sleeve 30 supported on and surrounding the shaft 10. Each adaptor 30 has a pair of diametrically opposed longitudinal abutments 31 of the same length as projections 27 and adapted to be engaged laterally by the opposed abutments 28 on the adjacent spacer 20. Thus, the projections 27 and abutments 31 alternate around the shaft 10 and serve the same functions as the parts 27—28 on adjacent ends of the spacers 20. An end collar 32 surrounds the outer end of the adaptor sleeve 30 and carries a releasable element in the form of a screw 33 extending through a hole in the sleeve for positively securing the latter against rotational or sliding movement on the shaft 10. Each adaptor sleeve 30 is surrounded by an end roll section 34 rotatably mounted on the sleeve by ball-bearing units 35, which are held apart by a spacer ring 36. The collar 32 and screw 33 serve not only to lock the adaptor sleeve 30 on the shaft, but also to hold the ball-bearing units 35 and then spacer 36 against shoulders 30a and 34a on the adaptor sleeve 30 and roll section 34, respectively.

The roll sections 19 and 34 are closely surrounded by a rubber-like or elastic sheath 37 which forms the working face of the roll and is engaged by the sheet material (not shown) to be treated. At each end of the sheath 37 is an end cap 38, which is preferably made of a flexible rubber-like material. Each end cap has a peripheral flange 38a closely surrounding the adjacent end portion of the sheath 37, the latter end portion being reduced and forming a pressed fit within the flange 38a. A relatively rigid ring 39, which may be made of metal, is press-fitted into the cap 38 and is internally threaded so that the cap can be screwed onto the outer end of the adjacent end roll section 34. A metal sealing ring 40 is press-fitted or otherwise secured in a small diameter portion of the cap 38 and engages a pair of flexible annular ribs 41 on the outer surface of the adjacent boot 17.

It is to be understood that the particular manner of mounting the ends of the shaft 10 and sealing the interior of the roll by means of the end caps 38 and the co-acting boots 17 forms no part of the present invention and, in fact, is the subject of a copending application of Frank B. Morrill, Serial No. 371,949, filed August 3, 1953. It is disclosed here only because I prefer to use this mounting and sealing arrangement due to its effectiveness and simplicity, although other sealing arrangements can, of course, be used. As illustrated, the shaft 10 and the protective boot 17 at each end thereof are held stationary in the corresponding clamp or bracket 11—12 during the operation of the roll, while the sealing ring 40 of each end cap rotates with the cap and the sheath 37, the rotating ring making a firm contact around the stationary ribs 41.

In the operation of the roll, its rotation by the longitudinal feeding of the fabric will, of course, exert a torsional thrust through the ball bearing units to the spacers, 20 and adaptor sleeves 30, tending to rotate them in one and the same direction on the shaft 10. Let it be assumed that this direction is clockwise as viewed from the right end of the shaft in Figs. 1 and 2. The adaptor sleeve 30 at the right end of the shaft is positively locked thereon by the screw 33. The spacer 20 adjacent thereto (which will be called the first spacer) cannot be rotated clockwise once its abutments 28 have laterally engaged the adaptor abutments 31, and it cannot thereafter rotate counter-clockwise because the tendency is for it to be rotated clockwise through the action of the sheet material on the sheath 37. Similarly, the second spacer 20 cannot be rotated clockwise relative to the first spacer once their respective abutments 28 have come into lateral engagement, and it cannot rotate counter-clockwise relative to the first spacer because the rotation of the sheath 37 by the travelling sheet material prevents this; and so on for the successive spacers. Consequently, only a limited rotation of the spacers 20 is allowed relative to the shaft 10 at the outset, and thereafter they will be held against rotation by the inter-engaging abutments 28 and 31.

While I have referred to the use of an end collar 32 at each end of the roll, for releasably locking the corresponding adaptor sleeve 30, it is sufficient if only one of these collars is locked by its screw 33. That is, as long as the adaptor sleeves 30 and spacers 20 are held together in end-to-end relation, as described, the positive locking of the adaptor sleeve at either end of the shaft will fix the angular positions of all spacers due to engagement of the abutments 28—31, and the spacers will be held in their respective angular positions until the direction of rotation of the roll by the sheet material is reversed. Thereupon, the spacers 20 will adjust themselves by slight rotation in the opposite direction on the shaft, until the abutments 28—31 again come into contact to prevent further rotation of the spacers relative to the shaft. Since this reversal of the direction of rotation occurs infrequently, almost, in the usual practice, the occasional slight rotational shifting of the spacers on the shaft can be tolerated. However, if it is desired that such rotational shifting shall be prevented at all times, this can be done by first tightening the screw 33 on the adaptor sleeve at one end of the shaft, then rotating the adaptor sleeve at the other end until the abutments 28—31 are tightly engaged and prevent further rotation, and then tightening the screw 33 on this last adaptor sleeve.

Each roll section 19 and the bearing 21 and spacer 20 within it may be assembled as a unit before being applied to the shaft 10. These units and the end roll sections 34 may be inserted endwise into the sheathing 37 before the shaft 10 is passed through them, or the sheathing may be applied later. The boots 17 are applied to the shaft after the units 19—20—21 and the end units 30—34—35 have been pushed together in the end-to-end relation previously described. One or both of the end screws 33 are then tightened before screwing the end caps 38 on the end roll sections 34.

It will be understood that in the new roll assembly the extensions 27—28 and 31 on the parts 20 and 30 serve not only to space the roll sections 19—34 from each other but also to prevent rotation of the spacers relative to each other, so that they will be held in fixed angular positions on the shaft by one or both of the screws 33. By reason of the loose fit of the spacers 20 around the shaft 10, except at the relatively narrow portions 20a, the units 19—20—21 can be easily slid along the curved part of shaft in assembling or disassembling the roll; and the same units 19—20—21 can be used with considerable variation in the shaft curvature.

I claim:

1. An expander and contractor roll for flexible sheet material, which comprises a stiff longitudinally curved shaft, generally cylindrical roll sections surrounding but spaced from the shaft and disposed in end-to-end relation, an elastic sheath closely surrounding the roll sections, a series of generally cylindrical spacers surrounding and supported on the shaft within the roll sections and rotatable relative to the shaft except as hereinafter specified, bearing means rotatably mounting the roll sections on the spacers and securing each roll section against longitudinal movement relative to the spacer within it, the spacers being slidable along the shaft but interconnected in end-to-end relation to space the roll sections from each other along at least part of their ends, an abutment on each spacer engageable with an adjacent spacer to prevent rotation of the spacers relative to each other, and means for holding one of the spacers against rotation on the shaft, whereby said one spacer and the abutments on the spacers hold all of the spacers against rotation relative to the shaft.

2. An expander and contractor roll according to claim 1, in which said holding means are engageable with a spacer at one end of said series.

3. An expander and contractor roll according to claim 1, in which said holding means include a sleeve on the shaft having an abutment engageable with the spacer at one end of said series to prevent relative rotation of the sleeve and said end spacer, and a releasable element securing the sleeve against rotation on the shaft.

4. An expander and contractor roll according to claim 1, in which said holding means include a sleeve on the shaft having an abutment engageable with the spacer at one end of said series to prevent relative rotation of the sleeve and said end spacer, and a releasable element securing the sleeve against rotation on the shaft, the roll also including a roll section within one end portion of said rubber-like member and surrounding said sleeve, and bearing means rotatably mounting said last roll section on the sleeve.

5. An expander and contractor roll according to claim 1, in which each spacer has a flange at one end extending generally radially of the shaft and forming the abutment.

6. An expander and contractor roll according to claim 1, in which each spacer has an abutment at each end thereof engageable with the adjacent abutment of the next spacer in the series.

7. An expander and contractor roll according to claim 1, in which each spacer has a longitudinal projection at each end abutting the adjacent end of the next spacer in said series but offset angularly from the adjacent longitudinal projection of said next spacer, to space the roll sections along at least part of their ends, each projection having a lateral face forming an abutment engageable with the lateral face of an adjacent projection on the next spacer to limit rotation of the spacers relative to each other.

8. An expander and contractor roll according to claim 1, in which each spacer has diametrically opposed longitudinal projections at each end abutting the adjacent end of the next spacer in said series but disposed between the adjacent longitudinal projections of said next spacer, to space the roll sections along at least part of their ends, each projection having a lateral face forming an abutment engageable with the lateral face of an adjacent projection on the next spacer to limit rotation of the spacers relative to each other.

References Cited in the file of this patent

UNITED STATES PATENTS

| | | |
|---|---|---|
| 1,668,994 | Weiss | May 8, 1928 |
| 1,953,177 | Isherwood | Apr. 3, 1934 |
| 2,562,949 | Robertson | Aug. 7, 1951 |
| 2,582,280 | Robertson | Jan. 15, 1952 |
| 2,689,392 | Robertson | Sept. 21, 1954 |